US012639517B2

(12) United States Patent
   Sodagar

(10) Patent No.: US 12,639,517 B2
(45) Date of Patent: May 26, 2026

(54) TOOLS FOR CONFORMANCE OF NETWORK-BASED MEDIA PROCESSING (NBMP) DOCUMENTS AND ENTITIES

(71) Applicant: Tencent America LLC, Palo Alto, CA (US)

(72) Inventor: Iraj Sodagar, Los Angeles, CA (US)

(73) Assignee: Tencent America LLC, Palo Alto, CA (US)

( * ) Notice: Subject to any disclaimer, the term of this patent is extended or adjusted under 35 U.S.C. 154(b) by 178 days.

(21) Appl. No.: 18/301,657

(22) Filed: Apr. 17, 2023

(65) Prior Publication Data

US 2023/0385544 A1      Nov. 30, 2023

Related U.S. Application Data

(60) Provisional application No. 63/332,613, filed on Apr. 19, 2022.

(51) Int. Cl.
   *G06F 17/00* (2019.01)
   *G06F 9/54* (2006.01)
   *G06F 40/279* (2020.01)
   *G06F 40/30* (2020.01)

(52) U.S. Cl.
   CPC ............ *G06F 40/279* (2020.01); *G06F 9/547* (2013.01); *G06F 40/30* (2020.01)

(58) Field of Classification Search
   None
   See application file for complete search history.

(56) References Cited

U.S. PATENT DOCUMENTS

| | | | | |
|---|---|---|---|---|
| 11,500,687 | B2 * | 11/2022 | Sodagar | .................. G06F 9/542 |
| 11,750,676 | B2 * | 9/2023 | Sodagar | .................. H04L 65/80 |
| | | | | 709/231 |
| 2003/0084429 | A1 | 5/2003 | Schaefer | |
| 2009/0271214 | A1 | 10/2009 | Kandasamy et al. | |
| 2015/0143064 | A1 * | 5/2015 | Bhargava | ............ G06F 11/1435 |
| | | | | 711/162 |

(Continued)

FOREIGN PATENT DOCUMENTS

| | | |
|---|---|---|
| JP | 2006-127496 A | 9/2005 |
| JP | 2021-533458 A | 12/2021 |

(Continued)

OTHER PUBLICATIONS

International Search Report and Written Opinion in International Patent Application No. PCT/US23/65935 dated Aug. 4, 2023, 9 pages.

(Continued)

*Primary Examiner* — Satwant K Singh
(74) *Attorney, Agent, or Firm* — Crowell & Moring LLP

(57) ABSTRACT

Methods, apparatus, and computer readable storage medium for verifying NBMP documents and entities. One method may include invoking an Application Programming Interface (API) corresponding to an API operation supported by an NBMP entity, the API operation being related to at least one of: a create operation; an update operation; a retrieve operation; or a delete operation; receiving a response from the NBMP entity; and determining, based on the response, whether the NBMP entity passes an API test corresponding to the API operation.

18 Claims, 8 Drawing Sheets

(56)             References Cited

U.S. PATENT DOCUMENTS

| | | | |
|---|---|---|---|
| 2016/0004622 A1 | 1/2016 | Kaulgud et al. | |
| 2017/0192879 A1 | 7/2017 | Athinathan | |
| 2021/0096903 A1* | 4/2021 | Sodagar | G06F 9/526 |
| 2021/0096904 A1* | 4/2021 | Sodagar | G06F 9/542 |
| 2021/0105338 A1 | 4/2021 | Oyman et al. | |
| 2021/0218787 A1* | 7/2021 | Sodagar | H04L 67/51 |
| 2022/0107832 A1* | 4/2022 | Sodagar | H04L 67/10 |

FOREIGN PATENT DOCUMENTS

| | | |
|---|---|---|
| JP | 2022-036800 A | 3/2022 |
| JP | 2022-526803 A | 5/2022 |

OTHER PUBLICATIONS

Revised text of ISO/IEC FDIS 23090-8 2nd edition Network-based Media Processing, Feb. 5, 2022, 223 pages.

Office Action issued in Japanese Patent Application No. 2024-532930 dated Apr. 23, 2025, w/English translation 6 pages.
Extended European Search Report issued in EP Application No. 23792740.5 dated Mar. 6, 2026 (11 pages).
"Methods for Testing and Specification (MTS); Methodology for RESTful APIs specifications and testing", ETSI Draft Specification; 203 647, European Telecommunications Standards Institute (ETSI), 650, Route Des Lucioles; F-06921 Sophia-Antipolis; France, vol. TC MTS Methods for Testing & Specification, No. V0.0.3 Jul. 24, 2020 (Jul. 24, 2020), pp. 1-63, XP014376221, Retrieved from the Internet: URL:docbox.etsi.org/MTS/MTS/07-Drafts/00203647/MTS-203647v003.docx (63 pages).
Yu You {NOKIA) et al: "Additions to NBMP API", 124. MPEG Meeting: Oct. 8, 2018-Oct. 12, 2018; MACAO; (Motion Picture Expert Group or ISO/IEC JTC1/SC29/WG11), No. m44023 Sep. 10, 2018 (Sep. 10, 2018), XP030190696, Retrieved from the Internet: URL:http://phenix.int-evry.fr/mpeg/doc_end_user/documents/124_Macao/wg11/m44023-v2-M44023.zip Nokia Response to NBMP CE APIs.docx.

* cited by examiner

600

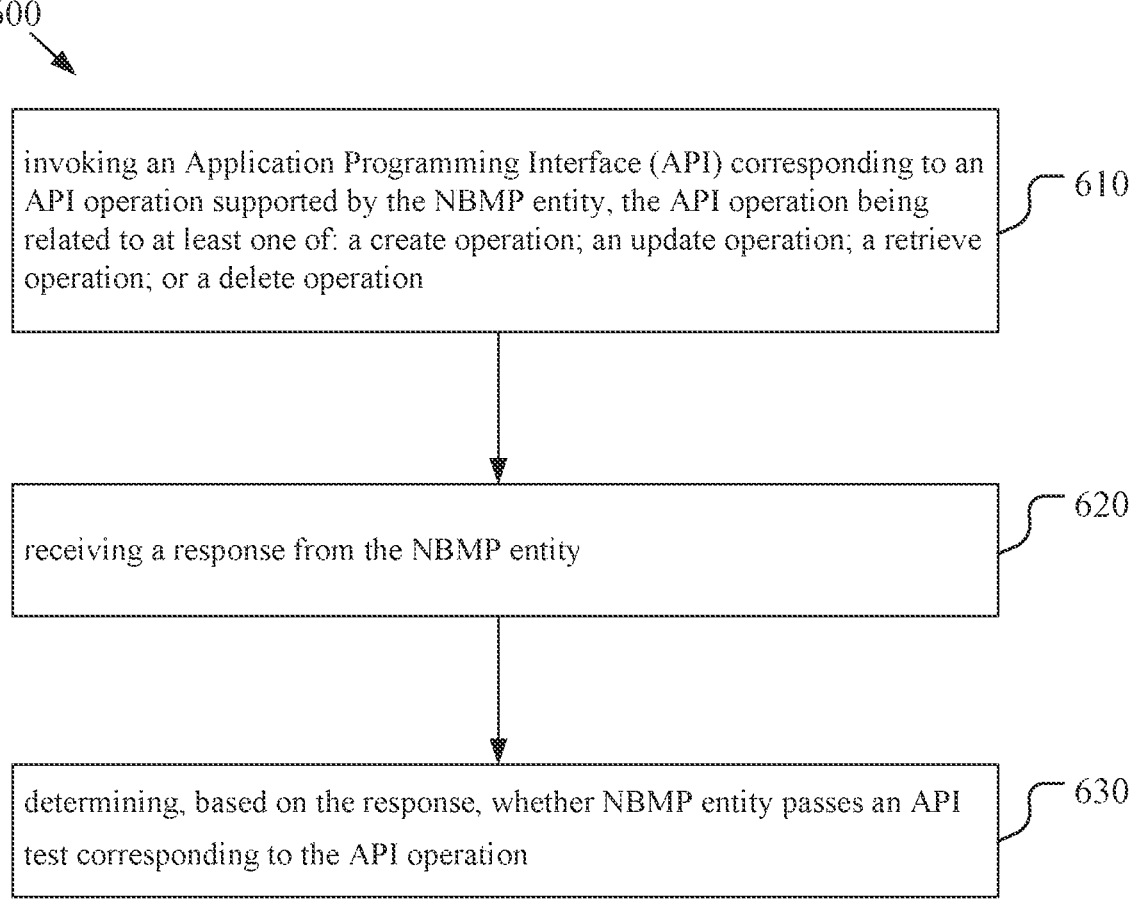

invoking an Application Programming Interface (API) corresponding to an API operation supported by the NBMP entity, the API operation being related to at least one of: a create operation; an update operation; a retrieve operation; or a delete operation ⟋ 610 receiving a response from the NBMP entity ⟋ 620 determining, based on the response, whether NBMP entity passes an API test corresponding to the API operation ⟋ 630

*FIG. 6*

TOOLS FOR CONFORMANCE OF NETWORK-BASED MEDIA PROCESSING (NBMP) DOCUMENTS AND ENTITIES

INCORPORATION BY REFERENCE

This application is based on and claims the benefit of priority to U.S. Provisional Application No. 63/332,613 filed Apr. 19, 2022, which is herein incorporated by reference in its entirety.

TECHNICAL FIELD

This disclosure generally relates to media streaming technologies including Network-Based Media Processing (NBMP). More specifically, the disclosed technology involves methods and apparatuses for tools to verify and ensure conformance of NBMP documents and entities.

BACKGROUND

This background description provided herein is for the purpose of generally presenting the context of the disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

A network and cloud platform may be used to run various applications. The Network Based Media Processing (NBMP) standard provides a specification for defining, instantiating, and running workflows on cloud-based platforms. The workflows can be run in parts, task by task, or a group of tasks at each time. NBMP shows a great potential to increase media processing efficiency, faster and lower-cost deployment of media services, and the ability to provide large scale deployment by leveraging the public, private or hybrid cloud services. In NBMP, various multimedia service providers and network/cloud service providers need to cooperate to provide customized immersive media services to customers.

SUMMARY

One or more example embodiments of the disclosure provide methods and apparatuses for media streaming technologies including NBMP.

Aspects of the disclosure provide a method for validating an NBMP document in an NBMP system is disclosed. The method may be performed by an NBMP document verifier running on at least one processor and may include obtaining the NBMP document, wherein the NBMP document comprises at least one of: a description document, or a descriptor document; selecting a baseline schema and a baseline rule based on the NBMP document; validating a schema of the NBMP document based on the baseline schema; validating a semantics of the NBMP document based on the baseline rule; and determining whether the NBMP document conforms to a NBMP standard based on results from validating the schema and the semantics of the NBMP document.

Aspects of the disclosure also provide a method for verifying a Network Based Media Processing (NBMP) entity in an NBMP system. The method may be performed by an NBMP entity verifier running on at least one processor and may include: invoking an Application Programming Interface (API) corresponding to an API operation supported by the NBMP entity, the API operation being related to at least one of: a create operation; an update operation; a retrieve operation; or a delete operation; receiving a response from the NBMP entity; and determining, based on the response, whether NBMP entity passes an API test corresponding to the API operation.

Aspects of the disclosure also provide a device or apparatus including a circuitry configured to carry out any of the method implementations above.

Aspects of the disclosure also provide non-transitory computer-readable mediums storing instructions which when executed by a computer cause the computer to perform any of the method implementations above.

BRIEF DESCRIPTION OF THE DRAWINGS

Further features, the nature, and various advantages of the disclosed subject matter will be more apparent from the following detailed description and the accompanying drawings in which:

FIG. 6 shows flow charts of a method according to an example embodiment of the disclosure.

DETAILED DESCRIPTION OF EMBODIMENTS

Figure 1:
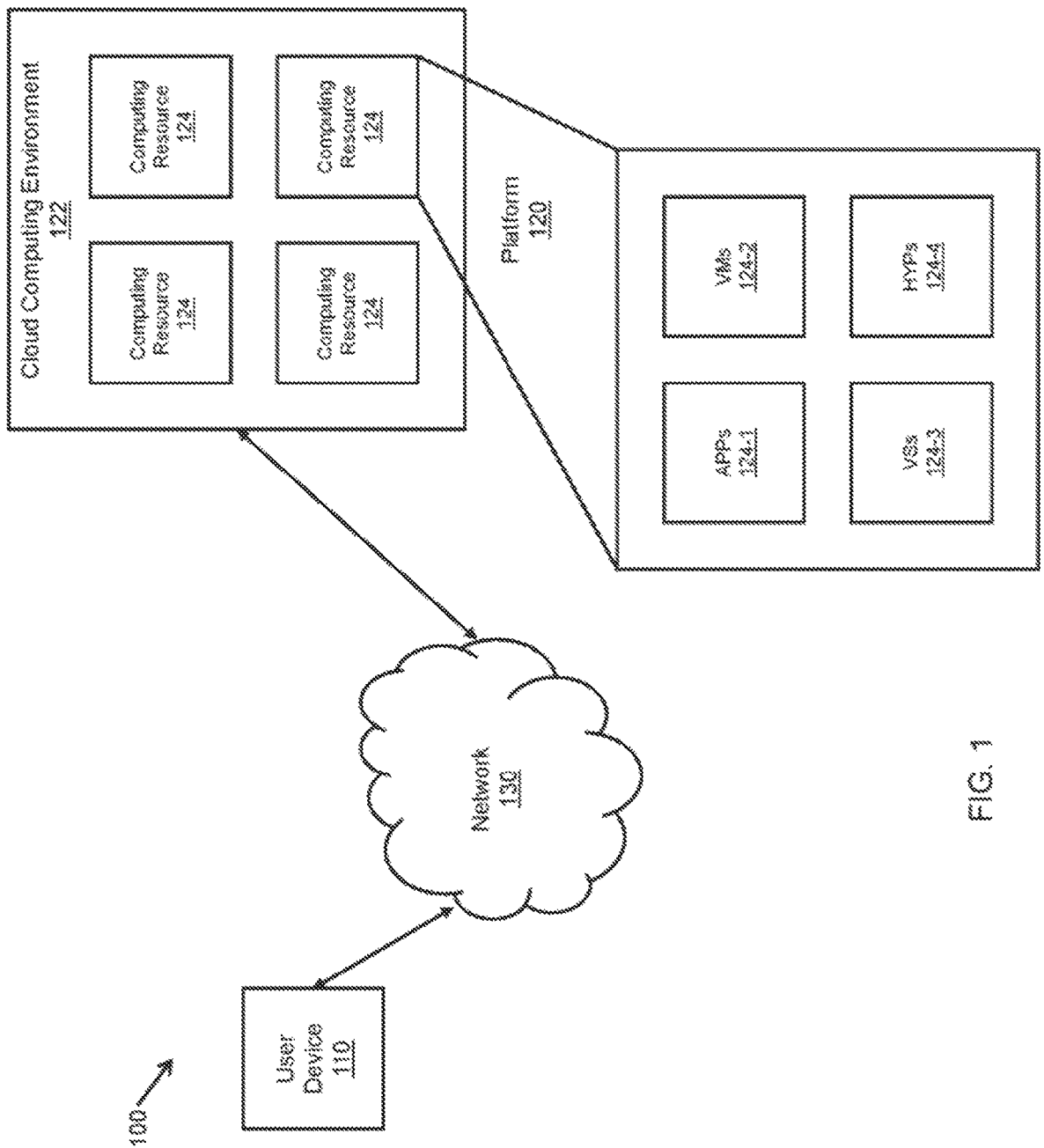
FIG. 1 is a schematic illustration of a communication system, according to one or more embodiments of the present disclosure.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g. a desktop computer, a laptop computer, a tablet computer, a handheld computer, a smart speaker, a server, etc.), a mobile phone (e.g. a smart phone, a radiotelephone, etc.), a wearable device (e.g. a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown in FIG. 1, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a WiMax network, a code division multiple access (CDMA) network, etc.), a Wi-Fi network, a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
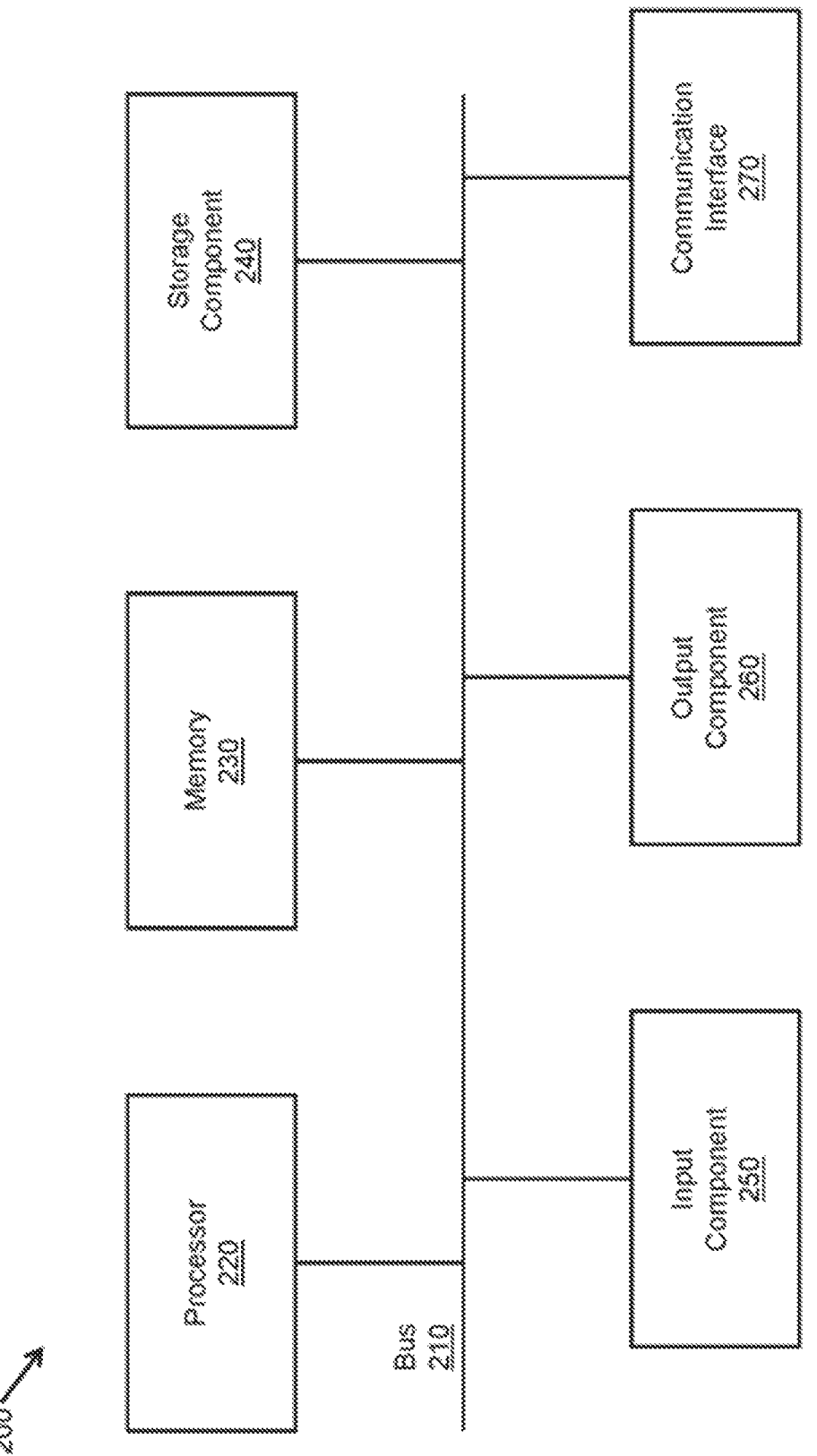
FIG. 2 illustrates a simplified example of a streaming environment, according to one or more embodiments of the present disclosure.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein, Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

For ease of description, this disclosure adopts terms and names defined in NBMP system-related standards. However, this disclosure is not limited by such terms and names and may be likewise applicable to multimedia systems conforming to other standards and performing the same or similar functions as those of the NBMP system.

Function Description: description of the details of a Media Processing Function, such as input and output description details, requested media processing, requirements, etc.

Function Repository: storage place where NBMP functions are retrieved from by an NBMP workflow manager or NBMP source.

Media Processing Entity: entity that runs one or more media processing task(s)

Media Resource: media data that is captured by the Media Source and is sent to the Media Processing Entities of the NBMP system.

Media Sink: entity that consumes the output of the NBMP Workflow through existing delivery methods Media Source: entity that provides the raw media content to be processed, such as a digital camera, a microphone, an encoder, or persistent storage.

NBMP Format: media format that is exchanged between the Media Source and the Media Processing Entities in an NBMP system, and between individual Media Processing Entities inside the NBMP system.

NBMP Function: Implementation of a standalone and self-contained media processing operation and the corresponding description of that operation NBMP Publish Format: media format of the content that is sent from Media Processing Entity to Media Sink.

NBMP Source: entity that provides triggers and describes media processing in the network NBMP system: system for processing media across one or more processing entities in the network and consisting of a Media Source, a NBMP Source, a NBMP Workflow Manager, a Function Repository, Media Processing Entity(ies) and Media Sink(s).

NBMP workflow: a graph of one or more connected Task(s) that achieve the requested media processing NBMP Workflow Manager: entity that provisions tasks and connects them to create a complete workflow based on a workflow description and function descriptions Supplementary Information: metadata or auxiliary information related to the media data or media processing operations Task: runtime instance of NBMP Function that gets executed inside a Media Processing Entity.

Task Description: description of the runtime details of a Task, such as input and output description details, requirements, configuration information etc.

Workflow Description: description of the details of the media processing, such as input and output description details, requested media processing, requirements etc. for the workflow.

Figure 3:
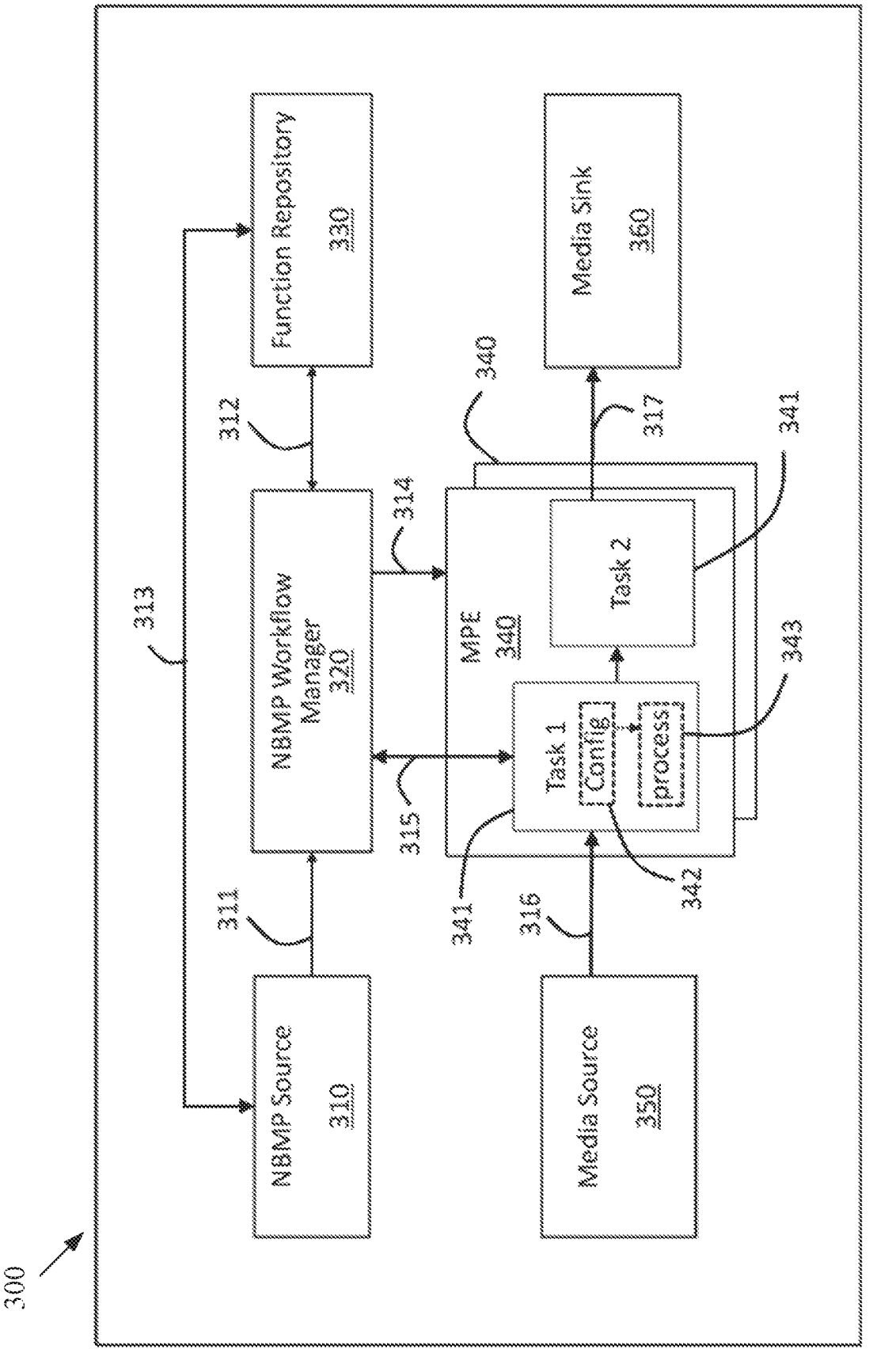
FIG. 3 illustrates a block diagram of an NBMP system, according to one or more embodiments of the present disclosure.

In an embodiment of the disclosure, a Network-Based Media Processing (NBMP) system is provided. FIG. 3 illustrates a NBMP architecture 300 according to embodiments herein and may be implemented with respect to cloud processing. The NBMP system 300 may include an NBMP source 310, an NBMP workflow manager 320, a function repository 330, one or more media processing entities (MPE) 340, a media source 350, and a media sink 360. The NBMP source 310, NBMP workflow manager 320, function repository 330, MPE 340, media source 350, and media sink 360 may include or be implemented by at least one or more processors and memory that store code configured to cause the at least one or more processors to perform the functions of the NBMP source 310, NBMP workflow manager 320, function repository 330, MPE 340, media source 360, and media sink 360, respectively.

The NBMP source 310 may communicate work flow descriptions with the NBMP workflow manager 320 via a NBMP workflow API 311. The NBMP source 310 may also communicate function descriptions with the function repository 330 via a function discovery API 313. For example, the NBMP source 310 may send workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, postprocessing, and encoding. The NBMP workflow manager 320 may communicate with the function repository 330 via a function discovery API 312, which may be a same or different API from the function discovery API 313, and may communicate with one or more of the MPE 340 via an API 314 (e.g., an MPE API).

Alternatively or additionally, the NBMP source 310 may request the NBMP workflow manager 320 to create workflow by using a set of keywords. For example, NBMP source 310 may send the NBMP workflow manager 320 the workflow description document that may include a set of keywords that the NBMP workflow manager 320 may use to find appropriate functions stored in the function repository 330. When the NBMP workflow manager 320 receives such information from the NBMP source 310 the NBMP workflow manager 320 may create the workflow by searching for appropriate functions using the keywords that may be specified in a Processing Descriptor of the workflow description document, and use the other descriptors in the workflow description document to provision tasks and connect them to create the workflow. The NBMP workflow manager 320 may comprise or be implemented by at least one processor and memory that stores code configured to cause the at least processor to perform the functions of the NBMP workflow manager 320.

The media processing entities (MPE) 340 may include one or more tasks 341. The NBMP workflow manager 320 may also communicate with the tasks 341 via API 315 (e.g., an NBMP Task API). The NBMP workflow manager 320 may use the API 315 to setup, configure, manage, and monitor one or more tasks 341 of a workflow that is performable by the one or more MPE 340. In order to configure, manage, and monitor tasks 341 of the workflow, the NBMP workflow manager 320 may send messages, such as requests, to one or more of the MPE 340 and/or the tasks 341, wherein each message may have several descriptors, each of which have several parameters. Additionally, the communications between the NBMP source 310, the NBMP workflow manager 320, the function repository 330, and the MPE 340 may be considered a control flow.

The tasks 341 may each include media processing functions 343 and configurations 342 for the media processing functions 343. Each of the tasks 341 in a respective media processing entity 340 may also communicate with each other facilitating data flow between tasks. In an embodiment, the NBMP workflow manager 320 may select the tasks based on the descriptions of the tasks in the WDD to search the function repository 330, via the function discovery API 312, to find the appropriate functions to run as tasks 341 for a current workflow. The one or more MPE 340 may be configured to receive media content from the media source 350, process the media content in accordance with the workflow, that includes tasks 341, created by the NBMP workflow manager 320, and output the processed media content to the media sink 360. In an embodiment, the one or more MPE 340 may be provided in parallel for multiple media flows 316 and 317 between the media source 350 and the media sink 360, respectively.

The media source 350 may include memory that stores media and may be integrated with or separate from the NBMP source 310. In an embodiment, the NBMP workflow manager 320 may notify the NBMP source 310 when a workflow is prepared and the media source 350 may transmit media content to the one or more MPE 340 based on the notification that the workflow is prepared and the one or more MPE 340 may transmit the media content to the media sink 360. The communications between the media source 350, the MPE 340, and the media sink 360 may be considered a data flow.

When the workflow manager 320 receives a workflow description document (WDD) from a NBMP client, it performs selection of media processing functions to be inserted into the workflow. Once the list of tasks that need to be included in the workflow is compiled, the workflow manager then connects those tasks to prepare the required workflow.

In some example implementations, the workflow manager 320 may generate a directed acyclic graph (DAG) from the WDD. Each node of the DAG represents a processing task in the workflow. Each node may take at least one input and generate at least one output. A link connecting one node to the other node in the graph represents the transfer of output of the former node as input to the later one. An NBMP workflow graph in general could have multiple inputs and outputs.

An NBMP system may include three layers: a logical layer, an object layer, and a resource layer. The logical layer may include logical items such as logical descriptions. The object layer may include data objects, such as JavaScript Object Notation (JSON) objects. The resource layer may include Representational State Transfer (REST) resources.

Exemplarily, there is a one-to-one relationship between a logical description and the corresponding data object, data document and REST resource.

NBMP logical items may include parameters, descriptors and descriptions.

A Workflow Object (WO), Task Object (TO), Function Object (FO), and MPE Capabilities Object (MO) are realization of the corresponding main descriptors as JSON objects.

In example implementations, Workflow Description Document (WDD), Task Description Document (TDD), Function Description Document (FDD), and MPE Capabilities Description Document (MDD) are documents containing single WO, single TO, single FO, and single MO, respectively. These documents may be JSON objects.

A Workflow Resource (WR), Task Resource (TR), Function Resource (FR), and MPE Capabilities Resource (MR) may be, for example, WDD, TDD, FDD, and MDD with valid URLs, respectively. These resources may be, for example, REST resources.

The aforementioned description documents, such as WDD, TDD, FDD, and WDD are exchanged between, for example, various entities in the NBMP framework as illustrated in FIG. 3.

For example, the WDD may be exchanged between the NBMP source 310 and the workflow manager 320. The FDD may be exchanged between the function repository 330 and the workflow manager 320; or between the function repository 330 and the NBMP source 310. The TDD may be exchanged between the workflow manager 320 and the tasks 341. The MDD may be exchanged between the workflow manager 320 and the MPE(s) 340.

In some example implementations, each of the description documents, such as WDD, TDD, FDD, and WDD, may be described using a set of descriptors. Each of the descriptors may be associated with a cardinality, and additional constraints. WDD, TDD, FDD, and WDD may be written and presented in a predefined format, such as a JSON format. Similarly, each descriptor may also be written and presented in a document following a predefined format, such as a JSON format.

Exemplarily, a description document or a descriptor document may be considered as a realization, or instantiation of a corresponding schema.

Table 1 shows an example function description which includes multiple descriptors.

TABLE 1

| Descriptor | Additional constraints | Cardinality |
|---|---|---|
| | Function description (FD) | |
| Scheme | None | 0-1 |
| General | Following parameters shall not be present:<br>priority;<br>nonessential;<br>location;<br>task-group.<br>The parameter id shall be a valid URI according to ETF RFC 3986. | 1 |
| Input | Following parameters shall not be present:<br>stream-id;<br>timeout. | 1 |
| Output | Following parameters shall not be present:<br>stream-id. | 1 |
| Processing | If the function is a function group, this descriptor shall contain a connection-map object.<br>Following parameters shall not be present:<br>start-time;<br>connection-map. | 0-1 |
| Requirements | Following parameters shall not be present:<br>proximity;<br>proximity-equation;<br>split-efficiency.<br>In function description, only maximum or minimum values should be specified. | 0-1 |
| Configuration | None | 0-1 |
| Step | If this descriptor is used, the function can be run in step operation.<br>If the case of stateless support, the input and output descriptors shall contain the sequence-number/start/duration metadata inputs and outputs for the corresponding input/outputs<br>Following parameter shall not be present:<br>operating-units. | 0-1 |
| Client-Assistance | Following parameters shall not be present:<br>measurement-collection-list;<br>source-assistance-information. | 0-1 |
| Assertion | None | 0-1 |
| Variables | The parameters shall not have the following item:<br>value. | 0-1 |
| Events | None | 0-1 |
| Security | None | 0-1 |

Cardinality: 1 = exactly one, 0-1 = zero or one

Note that the additional constraints as defined in the table above may be used as baseline rules for validating the semantic of an FDD.

The FD as defined above may be presented in JSON format. Table 2 below shows an example FDD schema in JSON.

TABLE 2

FD Schema

```
{
  "$schema": "http://json-schema.org/draft/2019-09/schema",
  "title": "ISO/IEC 23090-8:2022 Network Based Media Processing schema-Function Description",
  "type": "object",
  "required": ["general", "input", "output"],
  "properties": {
    "scheme": {"$ref": "nbmp-schema-definitions.json#/scheme"},
    "general": {"$ref": "nbmp-schema-definitions.json#/general"},
    "input": {"$ref": "nbmp-schema-definitions.json#/input"},
    "output": {"$ref": "nbmp-schema-definitions.json#/output"},
    "processing": {"$ref": "nbmp-schema-definitions.json#/processing"},
    "requirement": {"$ref": "nbmp-schema-definitions.json#/requirement"},
    "configuration": {"$ref": "nbmp-schema-definitions.json#/configuration"},
    "step": {"$ref": "nbmp-schema-definitions.json#/step"},
    "client-assistant": {"$ref": "nbmp-schema-definitions.json#/client-assistant"},
    "assertion": {"$ref": "nbmp-schema-definitions.json#/assertion"},
    "variables": {"$ref": "nbmp-schema-definitions.json#/variables"},
    "events": {"$ref": "nbmp-schema-definitions.json#/events"},
    "security": {"$ref": "nbmp-schema-definitions.json#/security"}
  }
}
```

As shown in Table 1 and Table 2, the FDD may include multiple descriptors, including required descriptors such as general descriptor, input descriptor, and output descriptor. There are also other optional descriptors, such as processing, requirement, configuration, step, client-assistant, etc. Note that whether a descriptor is defined as required or optional is just for exemplary purpose. Based on design requirement, a schema may include different descriptors. For example, a same descriptor may be defined as required in one release but optional in another release. Each of the descriptors may be presented in JSON format, and example descriptors will be described in later sections.

The FD schema defined above in JSON format may be used as a baseline schema for validating the schema of an FDD.

Table 3 shows an example workflow description which includes multiple descriptors.

TABLE 3

| Workflow description (WD) | | |
|---|---|---|
| Descriptor | Additional constraints | Cardinality |
| Scheme | None | 0-1 |
| General | Following parameters shall not be present: input-ports; output-ports; is-group; nonessential. | 1 |
| Repository | None | 0-1 |
| Input | None | 1 |
| Output | None | 1 |
| Processing | Following parameter shall not be present: image. | 1 |
| Requirements | The parameter typical-delay specifies the end-to-end delay requirements for the workflow. | 0-1 |
| Step | If this descriptor is used in stateless mode, the input and output descriptors shall contain the sequence-number/start/duration metadata inputs and outputs for the corresponding input/outputs. | 0-1 |
| Client-Assistance | None | 0-1 |
| Failover | None | 0-1 |
| Monitoring | Following parameter shall not be present: variable. | 0-1 |
| Assertion | None | 0-1 |
| Reporting | None | 0-1 |
| Notification | None | 0-1 |
| Acknowledge | None | 0-1 |
| Security | None | 0-1 |
| Scale | Only used with UpdateWorkflow operation | 0-1 |
| Schedule | None | 0-1 |

Cardinality: 1 = exactly one, 0-1 = zero or one

Note that the additional constraints as defined in the table above may be used as baseline rules for validating the semantic of a WDD.

Similarly, The WD as defined above may be presented in JSON format. Table 4 below shows an example WD schema in JSON.

TABLE 4

WD Schema

```
{
    "$schema": "http://json-schema.org/draft/2019-09/schema",
    "title": "ISO/IEC 23090-8:2022 Network Based Media Processing schema-Workflow Description",
    "type": "object",
    "required": ["general", "input", "output", "processing"]
    ],
    "properties": {
        "scheme": {"$ref": "nbmp-schema-definitions.json#/scheme"},
        "general": {"$ref": "nbmp-schema-definitions.json#/general"},
        "repository": {"$ref": "nbmp-schema-definitions.json#/repository"},
        "input": {"$ref": "nbmp-schema-definitions.json#/input"},
        "output": {"$ref": "nbmp-schema-definitions.json#/output"},
        "processing": {"$ref": "nbmp-schema-definitions.json#/processing"},
        "requirement": {"$ref": "nbmp-schema-definitions.json#/requirement"},
        "step": {"$ref": "nbmp-schema-definitions.json#/step"},
        "client-assistant": {"$ref": "nbmp-schema-definitions.json#/client-assistant"},
        "failover": {"$ref": "nbmp-schema-definitions.json#/failover"},
        "monitoring": {"$ref": "nbmp-schema-definitions.json#/monitoring"},
        "assertion": {"$ref": "nbmp-schema-definitions.json#/assertion"},
        "reporting": {"$ref": "nbmp-schema-definitions.json#/reporting"},
```

TABLE 4-continued

| WD Schema |
| --- |
| "notification": {"$ref": "nbmp-schema-definitions.json#/notification"},<br>"acknowledge": {"$ref": "nbmp-schema-definitions.json#/acknowledge"},<br>"security": {"$ref": "nbmp-schema-definitions.json#/security"},<br>"scale": {"$ref": "nbmp-schema-definitions.json#/scale"},<br>"schedule": {"$ref": "nbmp-schema-definitions.json#/schedule"}<br>  }<br>} |

As shown in Table 3 and Table 4, the WDD may include multiple descriptors, including required descriptors such as general, input, output, processing, and requirement. There are also other optional descriptors, such as processing, requirement, configuration, step, client-assistant, etc.

The WD schema defined above in JSON format may be used as a baseline schema for validating the schema of an WDD.

Table 5 shows an example task description which includes multiple descriptors.

TABLE 5

Task description (TD)

| Descriptor | Additional constraints | Cardinality |
| --- | --- | --- |
| Scheme | None | 0-1 |
| General | Following parameters shall not be present:<br>task-group<br>The workflow manager shall assign actual stream IDs and creates necessary ports if needed. | 1 |
| Input | None | 1 |
| Output | None | 1 |
| Processing | Following parameters shall not be present:<br>keywords;<br>function-restrictions;<br>connection-map. | 1 |
| Requirements | Following parameters shall not be present:<br>proximity-equation<br>split-efficiency<br>The parameter typical-delay specifies the delay requirements for the task. | 0-1 |
| Configuration | None | 0-1 |
| step | If this descriptor is used in the stateless mode, the input and output descriptors shall contain the sequence-number/start/duration metadata inputs and outputs for the corresponding input/outputs. | 0-1 |
| Startup-Delay | None | 0-1 |
| Client-Assistance | None | 0-1 |
| Failover | None | 0-1 |
| Monitoring | None | 0-1 |
| Assertion | None | 0-1 |
| Reporting | None | 0-1 |
| Notification | None | 0-1 |
| Security | None | 0-1 |
| Acknowledge | None | 0-1 |

Note that the additional constraints as defined in the table above may be used as baseline rules for validating the semantic of a TDD.

The TD as defined above may be presented in JSON format. Table 6 below shows an example TDD schema in JSON.

TABLE 6

| TD Schema |
| --- |
| {<br>  "$schema": "http://json-schema.org/draft/2019-09/schema",<br>  "title": "ISO/IEC 23090-8:2022 Network Based Media Processing schema-Task Description",<br>  "type": "object",<br>  "required": [<br>    "general", "input", "output", "processing"<br>  ], |

TABLE 6-continued

| TD Schema |
| --- |

```
"properties": {
    "scheme": {"$ref": "nbmp-schema-definitions.json#/scheme"},
    "general": {"$ref": "nbmp-schema-definitions.json#/general"},
    "input": {"$ref": "nbmp-schema-definitions.json#/input"},
    "output": {"$ref": "nbmp-schema-definitions.json#/output"},
    "processing": {"$ref": "nbmp-schema-definitions.json#/processing"},
    "requirement": {"$ref": "nbmp-schema-definitions.json#/requirement"},
    "configuration": {"$ref": "nbmp-schema-definitions.json#/configuration"},
    "step": {"$ref": "nbmp-schema-definitions.json#/step"},
    "startup-delay": {"$ref": "nbmp-schema-definitions.json#/startup-delay"},
    "client-assistant": {"$ref": "nbmp-schema-definitions.json#/client-assistant"},
    "failover": {"$ref": "nbmp-schema-definitions.json#/failover"},
    "monitoring": {"$ref": "nbmp-schema-definitions.json#/monitoring"},
    "assertion": {"$ref": "nbmp-schema-definitions.json#/assertion"},
    "reporting": {"$ref": "nbmp-schema-definitions.json#/reporting"},
    "notification": {"$ref": "nbmp-schema-definitions.json#/notification"},
    "acknowledge": {"$ref": "nbmp-schema-definitions.json#/acknowledge"},
    "security": {"$ref": "nbmp-schema-definitions.json#/security"},
    }
}
```

The TD schema defined above in JSON format may be used as a baseline schema for validating the schema of an TDD.

Table 7 shows an example MPE Capabilities Description (MD) which includes multiple descriptors.

TABLE 7

| MPE Capabilities Description (MD) | | |
| --- | --- | --- |
| Descriptor | Additional constraints | Cardinality |
| Scheme | None | 0-1 |
| General | The 'id' shall be unique among all MPEs, including Source and Sink. Following parameters shall not be present: rank; published-time; priority; input-ports; output-ports; is-group; state. | 1 |
| Capabilities | This descriptor is used to describe the capabilities: | 0-1 |
| Variables | This descriptor lists MPE implementation-specific variables that are not included in the Capabilities Descriptor. | 0-1 |
| Events | This descriptor lists events in the case of changed resource capabilities such as the parameters defined in Capabilities Descriptor. | 0-1 |
| Monitoring | None | 0-1 |
| Reporting | None | 0-1 |
| Notification | None | 0-1 |

Cardinality: 1 = exactly one, 0-1 = zero or one

Note that the additional constraints as defined in the table above may be used as baseline rules for validating the semantic of an MDD.

The MD as defined above may be represented in JSON format. Table 8 below shows an example MDD schema in JSON.

TABLE 8

| MD Schema |
| --- |

```
{
    "$schema": "http://json-schema.org/draft/2019-09/schema",
    "title": "ISO/IEC 23090-8:2022 Network Based Media Processing schema-MPE Capabilities Description",
    "type": "object",
    "required": ["general"],
    "properties": {
        "scheme": {"$ref": "nbmp-schema-definitions.json#/scheme"},
        "general": {"$ref": "nbmp-schema-definitions.json#/general" },
        "capabilities": {"$ref": "nbmp-schema-definitions.json#/capabilities"},
```

TABLE 8-continued

| MD Schema |
| --- |
| "variables": {"$ref": "nbmp-schema-definitions.json#/variables"},<br>"events": {"$ref": "nbmp-schema-definitions.json#/events"},<br>"monitoring": {"$ref": "nbmp-schema-definitions.json#/monitoring"},<br>"reporting": {"$ref": "nbmp-schema-definitions.json#/reporting"},<br>"notification": {"$ref": "nbmp-schema-definitions.json#/notification"}<br>  }<br>} |

The MD schema defined above in JSON format may be used as a baseline schema for validating the schema of an MDD.

In this disclosure, the JSON format is used for exemplary purpose only. Other formats, including but not limited to extensible markup language (XML), may also used for the description documents.

Note that the schemas for WDD, TDD, FDD, and MDD are for exemplary purpose only. These schemas may serve as basic NBMP schemas, while further constraints may be added to these schemas, for example, based on practical design requirement, to form corresponding derived schemas. Derived schemas may also include any schemas that are variations of basic NBMP schemas. In some example implementation, both basic NBMP schemas and derive NBMP schemas may serve as baseline NBMP schemas for validating corresponding description documents. Note that a description document may be an instantiation of a particular schema.

In some example implementations, the NBMP schemas as defined in ISO/IEC 23090-8 (standard for Network based media processing) may be used as basic NBMP schemes.

The descriptors included in the description documents (e.g., WDD, TDD, FDD, and MDD) as described above may be presented in, for example, JSON format.

Table 9 shows an example Scheme descriptor schema. A Scheme descriptor document may be written (i.e., instantiated) based on the corresponding Scheme descriptor schema.

TABLE 9

| Scheme Descriptor Schema |
| --- |
| {<br>  "title": "Scheme Descriptor Schema",<br>  "type": "object",<br>  "required": ["uri"],<br>  "properties": {<br>   "uri": {<br>    "type": "string",<br>    "format":"uri"<br>    }<br>   }<br>  } |

Table 10 shows an example Startup-delay descriptor schema. A Startup-delay descriptor document may be written based on the corresponding Startup-delay descriptor schema.

TABLE 10

| Startup-delay Descriptor Schema |
| --- |
| {<br>  "title": "Startup-delay Descriptor Schema ",<br>  "type": "object", |

TABLE 10-continued

| Startup-delay Descriptor Schema |
| --- |
| "required": ["startup-delay-value"],<br>  "properties": {<br>   "startup-delay-value": {<br>    "type": "integer",<br>    "minimum": 0<br>    }<br>   }<br>  } |

Table 11 shows an example Client-Assistance descriptor schema.

TABLE 11

| Client-Assistance Descriptor Schema |
| --- |
| {<br>  "title": "Client-Assistance Descriptor Schema ",<br>  "type": "object",<br>  "required": ["client-assistance-flag"],<br>  "properties": {<br>   "client-assistance-flag": {<br>    "type": "boolean",<br>    "default": false<br>    },<br>   "measurement-collection-list": {"type": "object"},<br>   "source-assistance-information": {"type": "object"}<br>   }<br>  } |

In NBMP, many other descriptors may be defined and used. For example, these descriptors may include but not limited to: General descriptor, Input descriptor, Output descriptor, Processing descriptor, Requirements descriptor, Configuration descriptor, Failover descriptor, Event descriptor, Variables descriptor, Monitoring descriptor, Reporting descriptor, Notification descriptor, Assertion descriptor, Request descriptor, Acknowledge descriptor, Repository descriptor, Security descriptor, Step descriptor, Capabilities descriptor, Scale descriptor, Schedule descriptor, etc. A descriptor document may be written or presented in, for example, a JSON format, based on its corresponding descriptor schema.

The NBMP system may perform communication using an interface including a data format and Application programming interfaces (APIs) between entities connected via a network for media processing. The APIs may include, for example, the following APIs:

NBMP workflow API, which is used by NBMP source to create and control a media processing workflow.

NBMP function discovery API, which provides the means for workflow manager and/or NBMP source to discover media processing functions that can be loaded as part of a media processing workflow.

NBMP task API, which is used by the workflow manager to configure and monitor a task at runtime.

NBMP MPE API, which is used by the workflow Manager to retrieve the capabilities of the MPE.

Each API may include following aspects: API operations, API requests, and API responses.

The workflow API is used by the NBMP source (or NBMP client) to manage workflows through a workflow manager. The workflow manager may support the workflow API operations shown in Table 12.

TABLE 12

| | | | |
|---|---|---|---|
| Workflow API operations | | | |
| Operation | Description | Request resource requirements | Response requirements |
| CreateWorkflow | Create a workflow | WR including information needed to create a workflow The general descriptor's id shall not be included in this request | If successful, shall include: 1) HTTP status code 201 2) Response's body with updated WR including: a) A value for General descriptor's Id b) Updated information including endpoint information where to send media data, metadata, and other information If failed, shall include: 1) HTTP status codes 4xx or 5xx 2) Optionally, response's body with updated WR signalling failed descriptors or parameters The response may include an HTTP status code 3xx. A new request may be made using the redirection information in the HTTP header. If accepted, but the workflow is not created immediately, shall include: 1) HTTP status code 202 2) HTTP header Retry-After: HTTP-date/delay-seconds, in which HTTP-date/delay recommends the date or delay in seconds (as defined by RFC 7231) to get WR using operation RetrieveWorkflow. Response's body with updated WR including a value for General descriptor's id. |
| UpdateWorkflow | Update an existing workflow | Updated WR with identical general's id, previously received in CreateWorkflow's response | If successful, shall include: 1) HTTP status code 201 2) Response's body with updated WR including: a) General descriptor's id identical to the one in the request b) Updated information including endpoint information where to send media data, metadata, and other information If failed, shall include: 1) HTTP status codes 4xx or 5xx 2) Optionally, response's body with updated WR signalling failed descriptors or parameters If accepted, but the workflow response is not ready yet, shall include: 1) HTTP status code 202 2) HTTP header Retry-After: HTTP-date/delay-seconds, in which HTTP-date/delay recommends the date or delay in seconds (as defined by RFC 7231) to get WR using operation RetrieveWorkflow. Response's body with updated WR including a value for general descriptor's id. A successful or accepted response shall not be provided if the existing workflow is in the 'running' state and the workflow update may result in not properly processing any input data, and/or loss or repetition of any output data during the workflow update. |
| DeleteWorkflow | Terminate an existing workflow | WR with identical general's id, previously received in CreateWorkflow's response | If successful, shall include: HTTP status code 200 If failed, shall include: 1) HTTP status codes 4xx or 5xx 2) Optionally, response's body with updated WR signalling failed descriptors or parameters |
| RetrieveWorkflow | Retrieve an existing workflow | WR with identical general's id, previously received in CreateWorkflow's response | If successful, shall include: 1) HTTP status code 201 2) Response's body with updated WR including: a) General descriptor's identical to the one in the request b) Updated information including endpoint information where to send media data, metadata, and other information |

TABLE 12-continued

| Workflow API operations | | | |
|---|---|---|---|
| Operation | Description | Request resource requirements | Response requirements |
|  |  |  | If failed, shall include: 1) HTTP status codes 4xx or 5xx 2) Optionally, response's body with updated WR signalling failed descriptors or parameters If accepted, but the workflow response is not ready yet, shall include: 1) HTTP status code 202 HTTP header Retry-After: HTTP-date/delay-seconds, in which HTTP-date/delay recommends the date or delay in seconds (as defined by RFC 7231) to get WR using operation RetrieveWorkflow |

The workflow manager uses the task API operations to configure and control a task. Table 13 shows example task API operations.

TABLE 13

| Task configuration API | | | |
|---|---|---|---|
| Operation | Description | Request parameters | Response requirements |
| CreateTask | providing the task a configuration for media processing after MPE resources are allocated | TR including the information for task configuration General descriptor's id shall not be included in this request. | If successful, i.e. after task is instantiated to 'idle' state, shall include: 1) HTTP status code 201 2) Response's body with updated TR including: a) A value for General descriptor's Id b) Updated information including endpoint information where to send media data, metadata, and other information If failed, i.e. if task is not instantiated to 'idle' state, shall include: 1) HTTP status codes 4xx or 5xx 2) Optionally, response's body with updated TR signalling failed descriptors or parameters If accepted, but task is not created immediately, shall include: 1) HTTP status code 202 2) HTTP header Retry-After: HTTP-date/delay-seconds, in which HTTP-date/delay recommends the date or delay in seconds (as defined by RFC 7231) to get TR using operation UpdateTask. Response's body with updated TR including a value for General descriptor's id |
| UpdateTask | modify task's configuration | updated TR with identical general's id, previously received in CreateTask's response NOTE A parameter is added here to change the state of task from running to 'idle' state | If successful, i.e. the new configuration is in effect, shall include: 1) HTTP status code 201 2) Response's body with updated TR including: a) General descriptor's id identical to the one in the request b) Updated information including endpoint information where to send media data, metadata, and other information If failed, i.e. the new configuration did not occur, shall include: 1) HTTP status codes 4xx or 5xx 2) Response's body with updated TR signalling failed descriptors or parameters If accepted, but task is not created immediately, shall include: 1) HTTP status code 202 2) HTTP header Retry-After: HTTP-date/delay-seconds, in which HTTP-date/delay recommends the date or delay in seconds (as defined by RFC 7231) to get TR using operation UpdateTask. Response's body with updated TR including a value for General descriptor's id |
| GetTask | retrieve task configuration information | TR with identical general's id, previously received in | If successful, i.e. was able to retrieve the current configuration, shall include: 1) HTTP status code 200 2) Response's body with updated TR including: |

TABLE 13-continued

| | | Task configuration API | |
|---|---|---|---|
| Operation | Description | Request parameters | Response requirements |
| | | CreateTask's response | a) General descriptor's id identical to the one in the request b) Updated report descriptors which were included in the request If failed, i.e. was not able to retrieve the current configuration, shall include: 1) HTTP status codes 4xx or 5xx Response's body with updated TR signalling failed descriptors or parameters |
| DeleteTask | request to destroy task | TR with identical general's id, previously received in CreateTask's response | If successful, i.e. after destroying task, shall include: 1) HTTP status code 200 If failed, i.e. not be able to destroy task, shall include: 1) HTTP status codes 4xx or 5xx 2) Response's body with updated TR signalling failed descriptors or parameters |

Function discovery API is used by the workflow manager and NBMP source for discovery of NBMP functions supported by an NBMP platform. Referring to FIG. 3, these functions may be catalogued in a function repository using NBMP function description (FD).

A discovery query may be used to discover one or more functions in a function repository by the properties described in the query. A query string is used to describe these properties.

In some example implementations, a query string which conforms to IETF RFC 3986:2005, Section 3.4, may be used. The query string may include a set of key-value pairs, separated by a single '&' character. In each key-value pair, the key and value shall be separated by a single '=' character. A wildcard expression may be used in the query string. For example, "*'" may be used to match zero or more characters; "A" may be used to match the beginning of a value; and "$" may be used to match the end of a value.

Table 14 shows example function discovery API operations.

TABLE 14

| | Function discovery API operations | | |
|---|---|---|---|
| Operation | Description | Request parameters | Response |
| DiscoverFunctions | discover a set of functions | Query string shall include the key-value pairs describing the desired properties of the target function. Query string shall be empty, i.e. only '?' added to the end of function Repository's URL when it is required to discover all functions of repository. | If successful, shall include: 1) HTTP status code 200 1) Response's body including a collection of FDDs listing all accessible functions of repository with the matching values per key If failed, shall include: 1) HTTP status codes 4xx or 5xx If the search is performed and no function is found, the response shall be considered successful and an empty collection shall be included in the body. |
| DiscoverFunctionsInGroup | discover all functions in the function repository that belong to the given function group | Query string shall include the group's id of the group for which the function list is sought | If successful, shall include: 1) HTTP status code 200 2) Response's body including a collection of FDDs listing functions of repository that belong to the given Group id If failed, shall include: 1) HTTP status codes 4xx or 5xx If no function is found in repository, the response shall be considered successful and an empty collection shall be included in the body. |
| DiscoverGroupsOfFunction | discover all function groups that a given function belongs to | Query string shall include the function's id of the function for which function group information is sought | If successful, shall include: 1) HTTP status code 200 2) Response's body including a list of Group Ids that the given function is a member of If failed, shall include: 1) HTTP status codes 4xx or 5xx If no function is found in repository, the response shall be considered successful and an empty list shall be included in the body. |

The MPE API defines the interfaces for retrieval of MPE capabilities by the workflow manager. Table 15 shows example MPE API operations.

TABLE 15

MPE API operations

| Operation | Description | Request resource requirements | Response Requirements |
|---|---|---|---|
| RetrieveCapabilities | Retrieve Capabilities of MPE | MR with identical General's id, and optionally the desired list of MPE's ids/urls | If successful, shall include: 1) HTTP status code 2 01 2) Response's body with updated MR including: a) General descriptor's identical to the one in the request b) Updated capability information If failed, shall include: 1) HTTP status codes 4xx or 5xx 2) Optionally, response's body with updated MR signalling failed descriptors or parameters |
| UpdateMPE | Modify the configuration of MPE monitoring, reporting and notification | Updated resource previously received in RetrieveCapabilities's response. | If successful, the response shall include: 1) HTTP status code 2 01 a) Response's body with updated resource including the accepted variables and events in each corresponding descriptor If failed, the response shall include: 1) HTTP status codes 4xx or 5xx Optionally, response's body with updated resource signalling failed variables and/or events. |

In an NBMP system, the entities, such as the workflow manager entity, task entity, function repository entity, and the MPE entity, need to meet certain requirements, which are described below.

In example implementations, the workflow manager may need to support the following API aspects:

Workflow API operations responses;
Task API operations;
Function discovery API operations; and
MPE API operations.

When a request for media processing arrives from an NBMP source (or NBMP client) without a connection-map provided, the workflow manager will use the functions in the function repository using function discovery API to design one or more workflow options and then instantiate the workflow based on given preferences. In cases where the request from the NBMP client includes a workflow with a connection-map and associated functions, the workflow manager may request the function descriptions using function discovery API to instantiate the workflow.

Once the list of tasks that need to be included in the workflow is compiled, the workflow manager may then connect those tasks to prepare the required workflow.

If the workflow manager is incapable of creating the workflow or cannot access the functions, it will provide a response to the NBMP service to reflect it has failed to create the workflow.

The workflow manager may support the following transitions in the workflow's state:

onInstantiation, when it receives a CreateWorkflow operation, with 'state' is set to value 'instantiated'.

onInstantiation, when it receives a RetrieveWorkflow operation, with 'state' is set to 'instantiated', for a previously configured workflow, transitioning it to instantiated state.

onWorkflowConfig, when it receives an UpdateWorkflow operation, with 'state' is set to 'idle', while being in instantiated state, transitioning it to idle state.

onInstantiation followed by onWorkflowConfig, when it receives a CreateWorkflow operation, with 'state' is set to 'idle', transitioning it to instantiated state and then idle state.

onTermination, when it receives a DeleteWorkflow operation.

onReset, when it receives an UpdateWorkflow operation, with 'state' is set to 'instantiated', while being in idle state, transitioning it to instantiated state.

onErrorHandling, when it receives UpdateWorkflow while being in the error state.

onStart, when media data or metadata starts arriving, shall transition the state from idle state to running state.

onStop, when all media data or metadata stops arriving (by observing timeout values in all inputs and completing processing the received inputs), shall transition the state from running state to idle state.

onCompletion, when the processing is completed (by observing timeout values in all inputs and completing processing the received inputs), shall transition the state from running state to idle state.

OnError, when an error occurs, shall transition the state from running state to error state.

The Workflow Manager shall instantiate Tasks complying to Task Groups defined in a Workflow Description.

In example implementations, the Function repository shall support the following API aspect:

Function discovery API operations requests.

The function repository shall be able to store entries for the functions and function groups.

The function repository shall support inquiries using query string format, for example, as described earlier. If multiple key-value pairs included in the query string, the function repository shall return all functions descriptions for which each value in the key-values pairs of query string is matched.

The function repository shall support the basic wildcard search. In the case of existing wildcards in a value, the function repository shall return functions that have one or more properties that are partially matched with the non-wildcard parts of the corresponding value.

In example implementations, the task entity shall support the following API aspect:

Task API operations response.

A task shall support the following transitions of its state:

onInstantiation, when it receives a CreateTask operation, with 'state' is set to 'instantiated'.

onTaskConfiguration, when it receives an UpdateTask operation, with 'state' is set to 'idle'.

onInstantiation followed by onTaskConfiguration, when it receives a CreateTask operation with 'state' is set to 'idle'.

onTermination, when it receives a DeleteTask operation.

onReset, when it receives an UpdateTask operation, with 'state' is set to 'instantiated'.

onErrorHandling, when it receives UpdateTask while being in the error state.

onStart, when media data or metadata starts arriving, a task shall transition its state from the idle state to the running state.

onStop, when all media data or metadata stops arriving (by observing timeout values in all inputs and completing processing the received inputs), a task shall transition its state from the running state to the idle state.

onCompletion, when the processing is completed (by observing timeout values in all inputs and completing processing the received inputs), a task shall transition its state from running state to the idle state.

OnError, when an error occurs, a task shall transition its state from running state to the error state.

The workflow lifecycle is related to its tasks' lifecycles as the following:

For a workflow to be in the instantiated state, all its tasks shall be in their instantiated states.

For a workflow to be in idle state, all its tasks shall be in their idle states.

If one or more tasks of a workflow is in error state, the workflow shall transition to the error state.

For a workflow to be destroyed, all its tasks shall transition to the destroyed state.

An MPE shall support the following API aspects:

MPE API Operations response.

In an NBMP system, the description documents may generally include WDD, TDD, FDD, and MDD, which may be instantiations from corresponding schemas. These description documents may be further based on lower level supporting documents, such as NBMP descriptor schema documents, NBMP descriptor parameter documents (used to define NBMP parameters). These documents may be released from a single vendor, or multiple vendors. Meanwhile, these documents may also cover various releases and have different versions. Due to the large number of the description documents (and their supporting documents) needed to support an NBMP media flow, it is critical to ensure all these description documents, whether within a same vendor, or from different vendors, conform to the NBMP standard, both syntactically and semantically. Non-conformance in any one of these description documents may result in media service degradation, interruption, or even un-expected termination, which will severely impact user experience. Non-conformance of the description documents may also add operating, maintenance, and/or troubleshooting cost to the vendors and/or operators. For example, extensive time and effort is needed to located which document(s) is not in conformance. Therefore, it is beneficial to run certain pre-checks on these documents, to ensure document conformance. The pre-checks, or pre-validations, may validate these documents both syntactically and semantically.

In this disclosure, various embodiments are described for validating/checking the NBMP documents and checking the conformance of NBMP entities.

Figure 4:
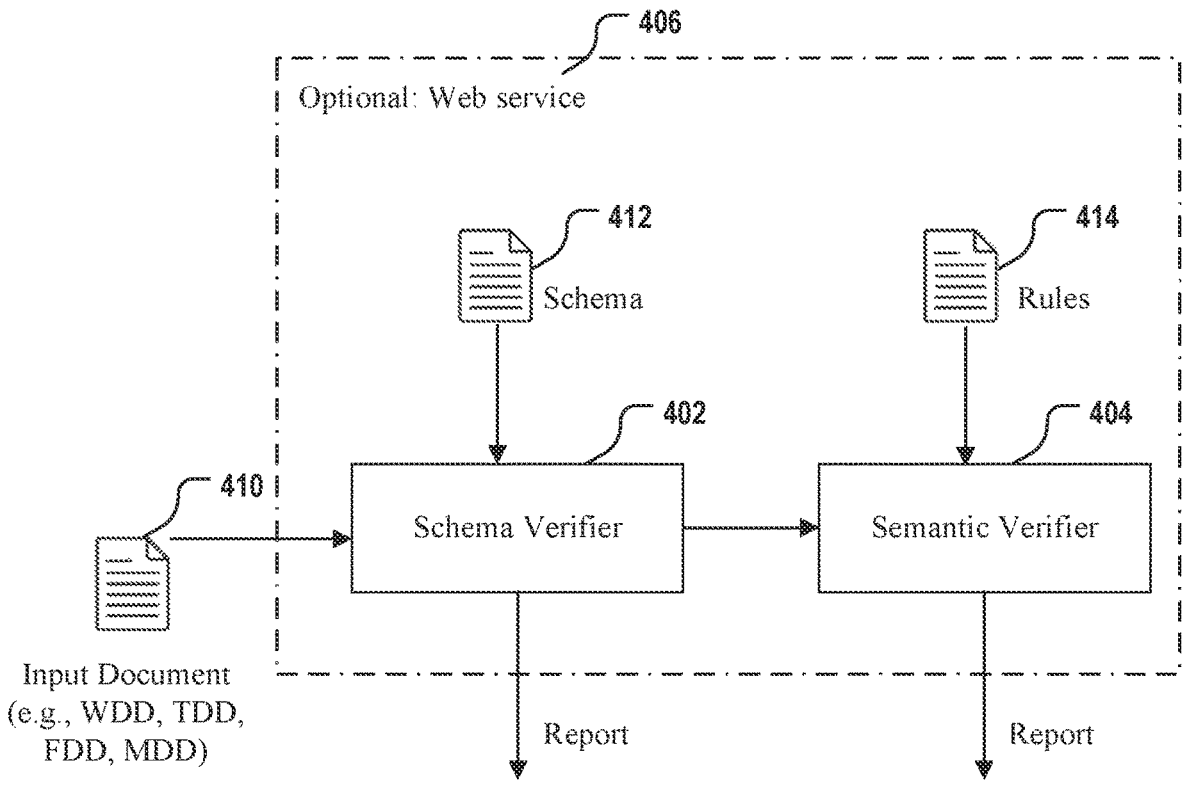
FIG. 4 shows an example NBMP schema verifier and an example NBMP semantic verifier.

Referring to FIG. 4, in one embodiment, a two-step validation process is introduced. As shown in FIG. 4, this verification process may employ a schema verifier 402 and a semantic verifier 404 (with these two verifiers generally referred to as an NBMP verifier). These two verifiers may be arranged in a serial connected manner.

The input document to the verification process may include any description documents, such as WDD, TDD, FDD, and MDD. As described earlier, each description document may include at least one descriptor. The input document may also include any descriptor documents, for example, descriptor document that is written or presented in JSON format.

As shown in FIG. 4, there are two steps in the verification process, which are described below.

Step 1—Schema Verification

An input document is verified by the schema verifier 402, based on an NBMP schema corresponding to the input document.

As an example, if the input document is a description document, such as a WDD, then a WDD baseline schema may be selected and referenced by the schema verifier. As another example, if the input document is a descriptor document, such as a scheme descriptor document, then a scheme descriptor schema may be selected and referenced by the schema verifier.

In some example implementations, basic NBMP schemas may be used as baseline schema.

In some example implementations, derived NBMP schemas based on the basic NBMP schemas may be used as baseline schema. As described earlier, derived NBMP schemas may include further constraints and/or descriptors.

In some example implementations, the schema verifier may pull in additional schema files (e.g., lower level schema files) when performing validation on an input file. For example, a description document may include multiple descriptors. To verify each descriptor, the schema verifier may pull in or read a descriptor schema corresponding to the each descriptor.

In this step, the schema of the input document is verified. For example, whether all required descriptors are included in the input document; whether there is unknown element such as descriptor in the input document.

Step 2—Semantic Verification

In this step, the semantic of the input document is verified.

As shown in Tables 1, 3, 5, and 7, additional constraints may be imposed to a description document, as defined in the "Additional constraints" column. These constraints may apply to at a descriptor level and may include additional requirements such as: one or more parameters should not present in a descriptor; one or more parameters should present in a descriptor; a precondition/trigger based on a descriptor for including or excluding certain parameters in the same descriptor; a precondition/trigger based on one descriptor for including or excluding certain parameters in a different descriptor; a descriptor in the description document should have an additional object if a precondition is met;

additional restriction needs to be imposed to a descriptor in the description document etc.

In some example implementations, the semantic verifier may compile a set of rule tables, with each table including the additional constrains for a particular description definition table. For example, the set of rule tables may include: a WDD rule table, a TDD rule table, an FDD rule table, and an MDD rule table. Exemplarily, each row in the table may represent a constraint.

In some example implementations, the rule table described above may apply to a descriptor level. That is, each descriptor may have a corresponding rule table which include the additional constraints.

In this step, for an input document, such as a description file (e.g., WDD, TDD, FDD, MDD), or a descriptor file, its semantic is verified based on, for example, the set of rule tables.

As an example, in a TDD, there is a "Processing" descriptor. There are additional constraints imposed on this descriptor: "Following parameters shall not be present: keywords; function-restrictions; connection-map" (refer to Table 5). Therefore, based on the rule table for TDD, the semantic of the input TDD is checked, to ensure such parameters do not present. Alternatively, the rule table may be compiled at descriptor level. In this case, the semantic verifier may use the corresponding descriptor rule table as a baseline. In this example, the table would be a "Processing" descriptor rule table.

Therefore, in this step, by using a set of rule tables, the semantic of the input document may be verified.

Step 1 and step 2 may each produce a verification report which shows the verification result. In case of verification failure, a failure code and/or detailed failure reason may be logged in the verification report. A combined report showing verification result of both step 1 and step 2 may also be produced.

In some example implementations, a web interface, or web service 406 may be provided by the NBMP verifier. An input document may be verified by accessing the NBMP verifier via the web service.

In an NBMP system, the media service may be provided by various vendors. Each vendor may implement its own NBMP entities, such as workflow manager entity, Media processing entity, task entity, and function repository entity. Entities belong to different vendors may need to interoperate with each other. Non-conformance of the entities may add operating, maintenance, and/or troubleshooting cost to the vendors and/or operators. For example, extensive time and effort is needed to located which entity is not in conformance. To ensure smooth media streaming service, it is critical that each of these entities conform to the NBMP standard. In this disclosure, various embodiments are described for NBMP entity verifier to validate the conformance of the NBMP entities. The conformance may cover various aspects including: API; state transition; event/task/workflow monitoring, reporting, and notification; interactions among these entities.

FIGS. 5a-5d illustrate example NBMP entity verifiers. Each of these verifiers interwork with an NBMP entity and is used to test/verify the conformance of the NBMP entity. The conformance tests may be performed from different perspectives, with details described below.

In some example implementations, API operations, such as create, update, retrieve, and delete operation of each API are tested. For example:

For workflow API, following operations will be tested: CreateWorkflow, UpdateWorkflow, DeleteWorkflow, and RetrieveWorkflow.

For task API, following operations will be tested: CreateTask, UpdateTask, GetTask, and DeleteTask.

For function discovery API, following operations will be tested: DiscoverFunctions, DiscoverFunctionsInGroup, and DiscoverGroupsOfFunction.

For MPE API, following operations will be tested: RetrieveCapabilities, and UpdateMPE.

In some example implementations, the monitoring, reporting, and notification functions of an NBMP entity is tested by the NBMP entity verifier.

Figure 5A:
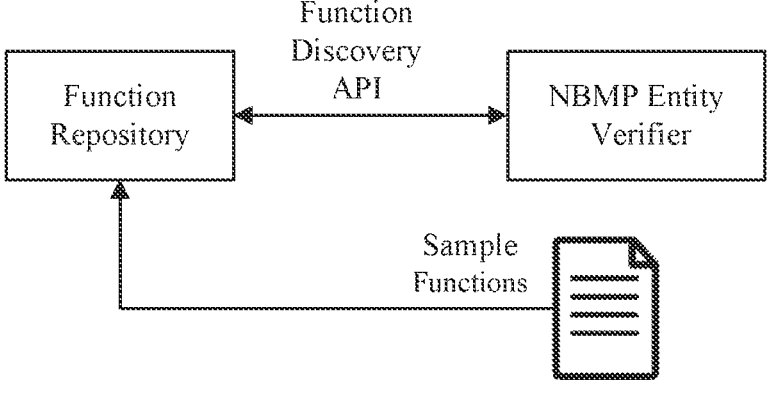
FIGS. 5a-5d shows example NBMP entity verifiers.
Figure 5B:
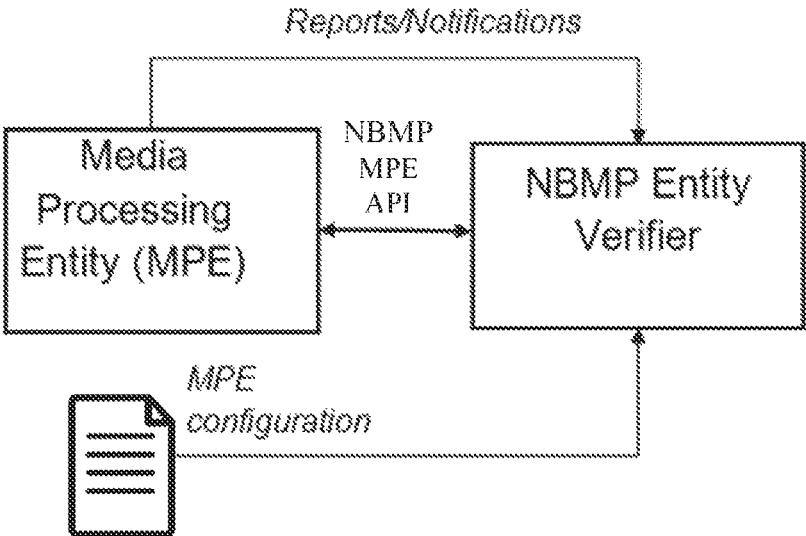

Referring to FIG. 5b, the NBMP entity verifier may receive reports and/or notifications from the MPE entity. The NBMP entity verifier may further check the sanity of the received reports and/or notifications.

Figure 5C:
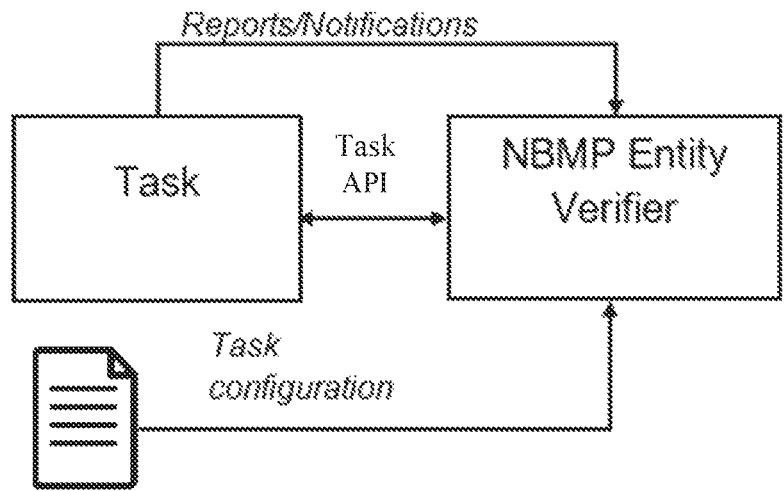

Referring to FIG. 5c, the NBMP entity verifier may receive reports and/or notifications from the task entity. The NBMP entity verifier may further check the sanity of the received reports and/or notifications.

Figure 5D:
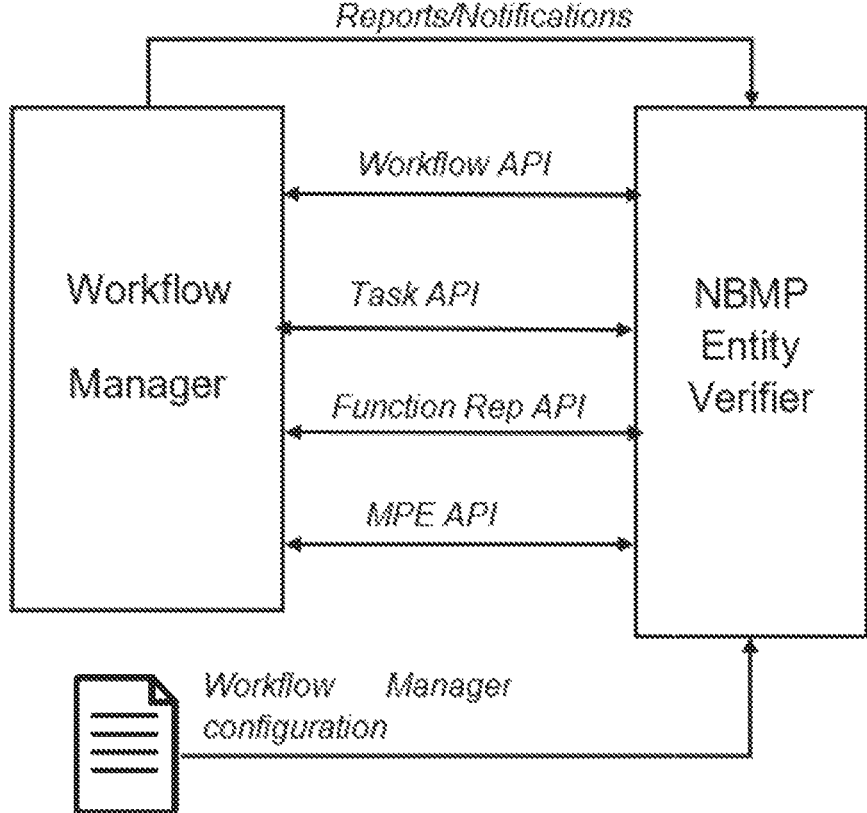

Referring to FIG. 5d, the NBMP entity verifier may receive reports and/or notifications from the workflow manager entity. The NBMP entity verifier may further check the sanity of the received reports and/or notifications.

In some example implementations, as shown in FIG. 5c, the NBMP entity verifier may get input from a task configuration file which contain configuration for one or more tasks. For each task, the NBMP entity verifier may use its corresponding configuration (obtained from the task configuration file) to drive the task API (e.g., using the configuration to form API function call parameters).

The NBMP entity verifier may configure the Monitor descriptor, the Reporting descriptor, and/or the Notification descriptor, via the task API. Once a report/notification is received, the verifier may further verify if the report/notification conforms to the corresponding configuration fed to the task entity.

For example, following parameters may be configured for the reporting descriptor: events, variables, system-events, system-variables, report-type, reporting-interval, report-start-time, url, and delivery-method. The NBMP entity verifier may verify that the report received conforms to these parameters. For example, the type of the report shold match "report-type" parameter, and the reporting interval should match "reporting-interval" parameter.

For another example, following parameters may be configured for the notification descriptor: events, variables, system-events, system-variables, notification-time, severity-level, notification-type, urls, notification-interval. The NBMP entity verifier may verify that the report received conforms to these parameters.

In some example implementation, the NBMP entity verifier may verify state transition behaviors of various NBMP entities. For example, as described in earlier sections, the workflow manager needs to support a workflow's state transition, and the task entity needs to support a task's state transition.

In some example implementation, the state transitions may be driven by the NBMP entity verifier via, for example, API calls to NBMP entities. That is, the NBMP entity verifier may invoke API calls to trigger a state transition, or a sequence of state transitions.

In some example implementations, the NBMP entity verifier may simulate multiple entities, and may further simulate a NBMP source. As such, an end-to-end service may be simulated and related NBMP entities may be tested.

For example, the NBMP entity verifier may initiate an NBMP service by using the simulated NBMP source. This will trigger interactions between Workflow Manager and Function Repository, Task, and MPE. As shown in FIG. 5d, the workflow manager may interact with the NBMP entity verifier (or respective simulated NBMP entities inside the NBMP entity verifier) via API calls, including: workflow API, task API, function repository API, and MPE API. The NBMP entity verifier may also modify, or delete the NBMP service which will also trigger corresponding interactions. The interactions between the workflow manager and other NBMP entities, such as the task entity, the function repository entity, and the MPE entity. The NBMP entity verifier may verify the interactions follow the NBMP requirement.

In some example implementations, a Workflow Manager implementation may not support all defined APIs in the NBMP standard. In those cases, the conformance tests would be limited to those which are defined. For example, if an implementation only supports Workflow API(s), then the test will be limited to workflow API(s).

In some example implementations, the verification tests performed by the NBMP entity verifier may include a set of test cases, each testing one or more aspects of the APIs, functional requirements, or state machine of the entity under test. For each test case, one or more document (e.g., description document) needs to be created, and the verifier needs to use those documents an input to drive the tests. The verifier is able to receive notifications and reports from the entities and cross-check them with the correct results in each test case.

FIG. 6 shows an exemplary method 600 for verifying a Network Based Media Processing (NBMP) entity in an NBMP system, the method being performed by an NBMP entity verifier running on at least one processor, and the method 600 may include a portion or all of the following step: step 610, invoking an Application Programming Interface (API) corresponding to an API operation supported by the NBMP entity, the API operation being related to at least one of: a create operation; an update operation; a retrieve operation; or a delete operation; step 620, receiving a response from the NBMP entity; and step 630, determining, based on the response, whether NBMP entity passes an API test corresponding to the API operation.

In this disclosure, a method for validating a Network Based Media Processing (NBMP) document in an NBMP system is disclosed. Performed by an NBMP document verifier running on at least one processor, the method may include: obtaining the NBMP document, wherein the NBMP document comprises at least one of: a description document, or a descriptor document; selecting a baseline schema and a baseline rule based on the NBMP document; validating a schema of the NBMP document based on the baseline schema; validating a semantics of the NBMP document based on the baseline rule; and determining whether the NBMP document conforms to a NBMP standard based on results from validating the schema and the semantics of the NBMP document.

In the above method, the NBMP document is presented in at least one of following formats: a JavaScript Object Notation (JSON) format; or an Extensible Markup Language (XML) format.

In the above method, the description document comprises at least one of: a workflow description document (WDD); a Task Description Document (TDD); a Function Description Document (FDD); or an MPE Capabilities Description document (MDD); and wherein the descriptor document comprises a document corresponding to a descriptor in the description document.

In the above method, selecting the baseline schema and the baseline rule based on the NBMP document may include: in response to the description document being the WDD, selecting a WDD baseline schema as defined in the NBMP system; in response to the description document being the TDD, selecting a TDD baseline schema as defined in the NBMP system; in response to the description document being the FDD, selecting an FDD baseline schema as defined in the NBMP system; and in response to the description document being the MDD, selecting an MDD baseline schema as defined in the NBMP system.

In the above method, the baseline rule may be compiled based on additional constraints imposed on at least one descriptor in the NBMP document.

In the above method, the additional constrains imposed on the at least one descriptor may include at least one of:

a parameter should not present in the at least one descriptor;

a parameter should present in the at least one descriptor;

an additional restriction on a parameter in the at least one descriptor; or the at least one descriptor or another descriptor in the NBMP document should have an additional object if a precondition is met.

Embodiments in the disclosure may be used separately or combined in any order. Further, each of the methods (or embodiments) may be implemented by processing circuitry (e.g., one or more processors or one or more integrated circuits). In one example, the one or more processors execute a program that is stored in a non-transitory computer-readable medium. In addition to NBMP, embodiments in the disclosure may be applied to other types of media processing technologies/standard.

The techniques described above, can be implemented as computer software using computer-readable instructions and physically stored in one or more computer-readable media. For example, FIG. 7 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 7:
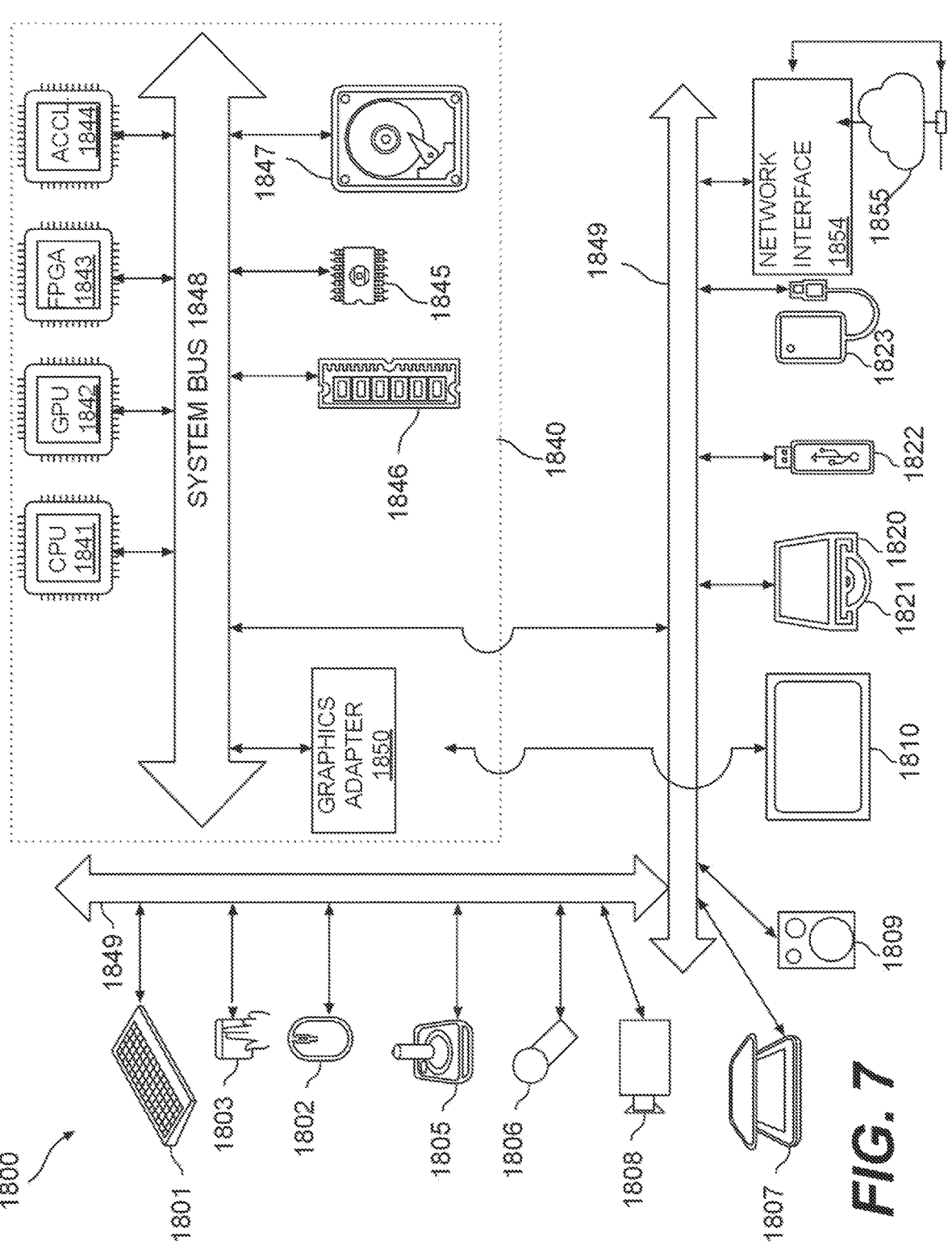
FIG. 7 shows a schematic illustration of a computer system in accordance with example embodiments of the disclosure.

The components shown in FIG. 7 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface (1854) to one or more communication networks (1855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bidirectional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), graphics adapters (1850), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). In an example, the screen (1810) can be connected to the graphics adapter (1850). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition to or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for verifying a Network Based Media Processing (NBMP) entity in an NBMP system, the method being performed by an NBMP entity verifier running on at least one processor, and the method comprising:
  invoking an Application Programming Interface (API) corresponding to an API operation supported by the NBMP entity, the API operation being related to at least one of:
    a create operation;
    an update operation;
    a retrieve operation; or
    a delete operation;
  receiving, from the NBMP entity, a response comprising a Hypertext Transfer Protocol (HTTP) status code; and
  determining, based on the HTTP status code, whether the NBMP entity passes an API test corresponding to the API operation.

2. The method of claim 1, wherein the NBMP entity comprises at least one of:
  a function repository entity;
  a task entity;
  a workflow manager entity; or
  a Media Processing Entity (MPE).

3. The method of claim 1, wherein:
  before invoking the API corresponding to the API operation supported by the NBMP entity, the method further comprises:
    retrieving a description document indicative of a resource associated with the NBMP entity, the resource comprising one of:
      a workflow resource;
      a task resource; or
      an MPE capabilities resource; and
    formulating an API parameter based on the resource; and
  invoking the API comprises:
    invoking the API corresponding to the API operation supported by the NBMP entity, using the API parameter as an input parameter of the API.

4. The method of claim 1, wherein:
  before invoking the API corresponding to the API operation supported by the NBMP entity, the method further comprises:
    retrieving a description document indicative of a resource associated with the NBMP entity, the description document being indicative of a descriptor comprising at least one of: a monitoring descriptor; a reporting descriptor; or a notification descriptor;
    formulating an API parameter based on the descriptor; and invoking the API comprises:
    invoking the API corresponding to the API operation supported by the NBMP entity, using the API parameter as an input parameter of API.

5. The method of claim 4, further comprising:
  in response to the descriptor comprising the reporting descriptor, receiving report from the NBMP entity, wherein the report is sent by the NBMP entity based on the reporting descriptor; or
  in response to the descriptor comprising the notification descriptor, receiving notification from the NBMP entity, wherein the notification is sent by the NBMP entity based on the notification descriptor.

6. The method of claim 1, wherein:
  the NBMP entity is a workflow manager entity;
  invoking the API triggers a state transition of a workflow configured by the workflow manager entity and triggered by the NBMP entity verifier; and
  the method further comprises:
    verifying the state transition of the workflow following a workflow lifecycle rule.

7. The method of claim 1, wherein:
  the NBMP entity is a task entity;
  invoking the API triggers a state transition of a task configured by the task entity and triggered by the NBMP entity verifier; and
  the method further comprises:
    verifying the state transition of the task following a task lifecycle rule.

8. The method of claim 2, wherein the NBMP entity verifier is capable of simulating an NBMP source, the method further comprising:
  triggering a sequence of actions to be performed by the workflow manager entity, the sequence of actions comprising: a creation of a workflow; a retrieval of the workflow; an update of the workflow, and a deletion of the workflow; and
  verifying the workflow manager entity interacting with the NBMP entity verifier using at least one of following APIs: a workflow API, a task API, a function repository API, or an MPE API, as required in the NBMP system.

9. A device hosting a Network Based Media Processing (NBMP) entity verifier for verifying an NBMP entity in an NBMP system, the device comprising a memory for storing computer instructions and a processor in communication with the memory, wherein, when the processor executes the computer instructions, the processor is configured to cause the device to:
  invoke an Application Programming Interface (API) corresponding to an API operation supported by the NBMP entity, the API operation being related to at least one of:
    a create operation;
    an update operation;
    a retrieve operation; or
    a delete operation;
  receive, from the NBMP entity, a response comprising a Hypertext Transfer Protocol (HTTP) status code; and
  determine, based on the HTTP status code, whether the NBMP entity passes an API test corresponding to the API operation.

10. The device of claim 9, wherein the NBMP entity comprises at least one of:
  a function repository entity;
  a task entity;
  a workflow manager entity; or
  a Media Processing Entity (MPE).

11. The device of claim 9, wherein:

before the processor is configured to cause the device to invoke the API corresponding to the API operation supported by the NBMP entity, the processor is configured to further cause the device to:

retrieve a description document indicative of a resource associated with the NBMP entity, the resource comprising one of:

a workflow resource;

a task resource; or an MPE capabilities resource; and formulate an API parameter based on the resource; and when the processor is configured to cause the device to invoke the API, the processor is configured to cause the device to:

invoke the API corresponding to the API operation supported by the NBMP entity, using the API parameter as an input parameter of API.

12. The device of claim 9, wherein:

before the processor is configured to cause the device to invoke the API corresponding to the API operation supported by the NBMP entity, the processor is configured to further cause the device to:

retrieve a description document indicative of a resource associated with the NBMP entity, the description document being indicative of a descriptor comprising at least one of: a monitoring descriptor; a reporting descriptor; or a notification descriptor;

formulate an API parameter based on the descriptor; and when the processor is configured to cause the device to invoke the API, the processor is configured to cause the device to:

invoke the API corresponding to the API operation supported by the NBMP entity, using the API parameter as an input parameter of API.

13. The device of claim 12, wherein, when the processor executes the computer instructions, the processor is configured to further cause the device to:

in response to the descriptor comprising the reporting descriptor, receive report from the NBMP entity, wherein the report is sent by the NBMP entity based on the reporting descriptor; or in response to the descriptor comprising the notification descriptor, receive notification from the NBMP entity, wherein the notification is sent by the NBMP entity based on the notification descriptor.

14. The device of claim 9, wherein:

the NBMP entity is a workflow manager entity;

invoking the API triggers a state transition of a workflow configured by the workflow manager entity and triggered by the NBMP entity verifier; and when the processor executes the computer instructions, the processor is configured to further cause the device to:

verify the state transition of the workflow following a workflow lifecycle rule.

15. The device of claim 9, wherein:

the NBMP entity is a task entity;

invoking the API triggers a state transition of a task configured by the task entity and triggered by the NBMP entity verifier; and when the processor executes the computer instructions, the processor is configured to further cause the device to:

verify the state transition of the task following a task lifecycle rule.

16. The device of claim 10, wherein the NBMP entity verifier is capable of simulating an NBMP source, and wherein, when the processor executes the computer instructions, the processor is configured to further cause the device to:

trigger a sequence of actions to be performed by the workflow manager entity, the sequence of actions comprising: a creation of a workflow; a retrieval of the workflow; an update of the workflow, and a deletion of the workflow; and verify the workflow manager entity interacting with the NBMP entity verifier using at least one of following APIs: a workflow API, a task API, a function repository API, or an MPE API, as required in the NBMP system.

17. A non-transitory storage medium for storing computer readable instructions, the computer readable instructions, when executed by a processor of a device hosting a Network Based Media Processing (NBMP) entity verifier for verifying an NBMP entity in an NBMP system, causing the processor to:

invoke an Application Programming Interface (API) corresponding to an API operation supported by the NBMP entity, the API operation being related to at least one of:

a create operation;

an update operation;

a retrieve operation; or a delete operation;

receive, a response from the NBMP entity, a response comprising a Hypertext Transfer Protocol (HTTP) status code; and determine, based on the response HTTP status code, whether the NBMP entity passes an API test corresponding to the API operation.

18. The non-transitory storage medium of claim 17, wherein the NBMP entity comprises at least one of:

a function repository entity;

a task entity;

a workflow manager entity; or a Media Processing Entity (MPE).

* * * * *